US010257025B2

(12) United States Patent
Thompson et al.

(10) Patent No.: US 10,257,025 B2
(45) Date of Patent: *Apr. 9, 2019

(54) EMERGENCY COMMUNICATION SOLUTION

(71) Applicant: PIONEERNET SOLUTIONS INC., Ottawa (CA)

(72) Inventors: Gregg Thompson, Ottawa (CA); Rex Benning, Santa Clara, CA (US)

(73) Assignee: Pioneernet Solutions, Inc., Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,342

(22) Filed: Jan. 9, 2017

(65) Prior Publication Data

US 2017/0118073 A1 Apr. 27, 2017

Related U.S. Application Data

(63) Continuation of application No. 14/300,578, filed on Jun. 10, 2014, now Pat. No. 9,571,647.

(Continued)

(51) Int. Cl.
*H04L 12/66* (2006.01)
*H04L 12/24* (2006.01)
(Continued)

(52) U.S. Cl.
CPC ...... *H04L 41/0686* (2013.01); *H04L 41/0677* (2013.01); *H04L 43/10* (2013.01);
(Continued)

(58) Field of Classification Search
CPC ..... H04L 12/26; H04L 12/64; H04L 12/6418; H04L 29/06176; H04L 43/10; H04L 45/00; H04L 45/02; H04L 45/04; H04L 65/02; H04L 65/102; H04L 2012/64; H04M 3/22; H04M 3/2208; H04M 3/42;
(Continued)

(56) References Cited

U.S. PATENT DOCUMENTS 6,069,890 A * 5/2000 White ............... H04M 3/4228
370/352
6,542,500 B1 * 4/2003 Gerszberg ........... G06Q 50/188
370/354

(Continued)

*Primary Examiner* — Frank Duong
(74) *Attorney, Agent, or Firm* — Rosenberg, Klein & Lee (57) ABSTRACT

A communication system for emergency communication comprises a communication server to establish an IP based voice communication between an endpoint and a monitoring center. In one implementation, the system establishes an emergency call using an emergency communication system comprising a communication endpoint, a communication interface and a monitoring center comprising an automation system and a communication server to establish an IP based voice communication. The system initiates the emergency call at the endpoint location using the communication interface, establishes an IP based voice communication between the endpoint and the monitoring center via the communication server, and automatically sends a message from the communication server to the automation system when the call is initiated.

20 Claims, 7 Drawing Sheets

Related U.S. Application Data (60) Provisional application No. 61/833,283, filed on Jun. 10, 2013.

(51) Int. Cl.
| | |
|---|---|
| *H04M 3/51* | (2006.01) |
| *H04M 3/22* | (2006.01) |
| *H04L 12/26* | (2006.01) |
| *H04M 11/04* | (2006.01) |
| *H04M 3/42* | (2006.01) |
| *H04M 7/00* | (2006.01) |

(52) U.S. Cl.
CPC ....... *H04M 3/2281* (2013.01); *H04M 3/5116* (2013.01); *H04M 3/5133* (2013.01); *H04M 11/045* (2013.01); *H04M 3/42059* (2013.01); *H04M 3/42357* (2013.01); *H04M 7/006* (2013.01); *H04M 2242/04* (2013.01); *H04M 2250/52* (2013.01)

(58) Field of Classification Search
CPC .. H04M 3/42357; H04M 3/51; H04M 3/5116; H04W 4/22; H04W 76/007; H04W 76/10
See application file for complete search history.

(56) References Cited

U.S. PATENT DOCUMENTS

| | | | | |
|---|---|---|---|---|
| 7,593,512 | B2* | 9/2009 | Elliot | G08B 25/08 340/508 |
| 8,059,631 | B2* | 11/2011 | Anto Emmanuel | H04M 3/5116 370/338 |
| 8,184,785 | B2* | 5/2012 | Kuroda | B66B 3/00 379/106.01 |
| 2004/0086093 | A1* | 5/2004 | Schranz | H04L 12/1895 379/37 |

* cited by examiner

PRIOR ART

EMERGENCY COMMUNICATION SOLUTION

CROSS-REFERENCE TO RELATED APPLICATIONS

This application claims the benefit as a continuation of U.S. patent application Ser. No. 14/300,578 filed Jun. 10, 2014 which itself claims the benefit of priority from U.S. Provisional Patent Application No. 61/833,283, filed on Jun. 10, 2013, both of which are incorporated herein by reference in its respective entirety.

FIELD OF THE INVENTION

The present disclosure relates to the Emergency Communication Solution (ECS) which provides a monitored and stable communication path between an emergency phone location and a monitoring center operator.

BACKGROUND

Figure 1:
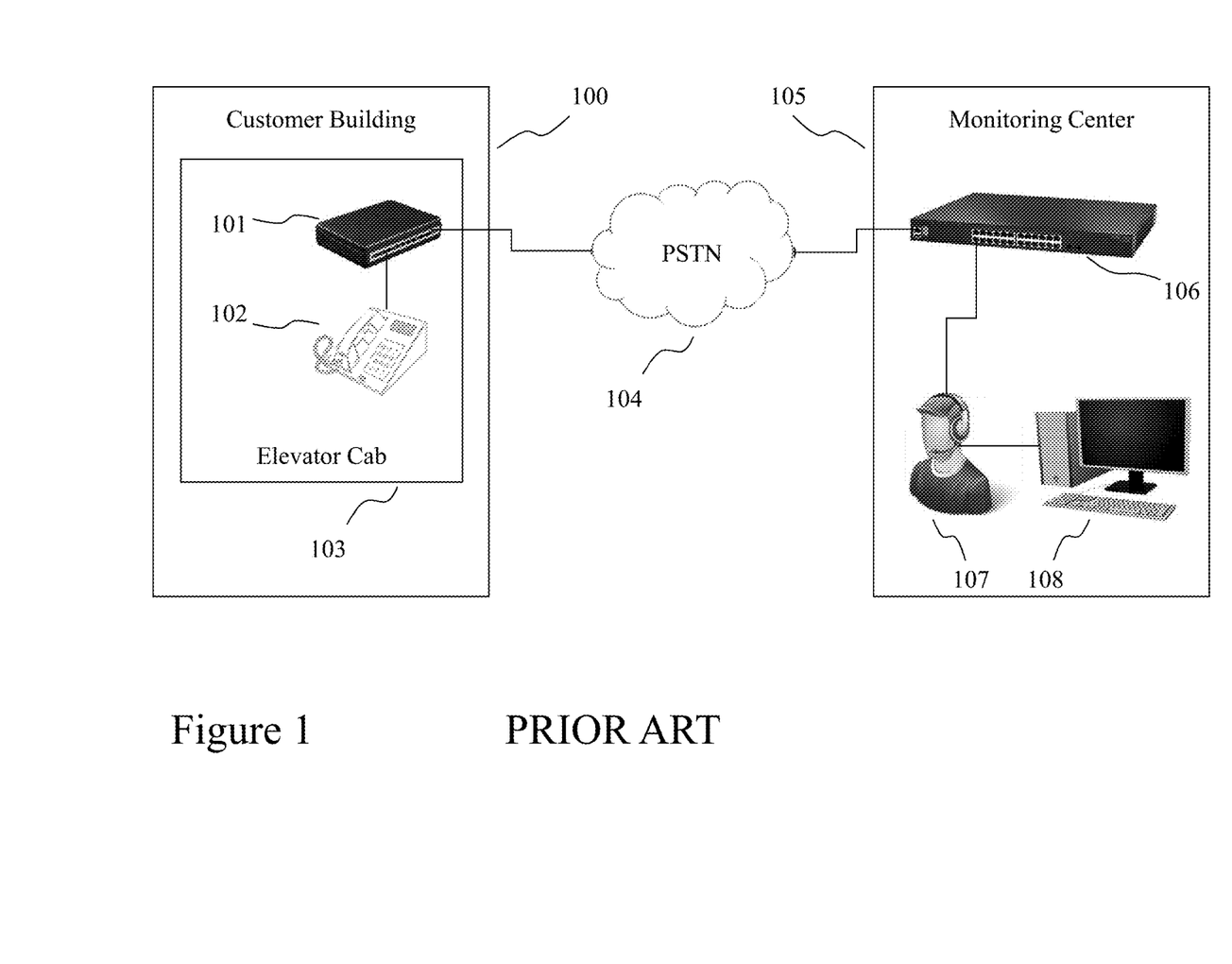
FIG. 1 is a topology diagram of the existing topology used to meet the current TSSA codes.

Referring to FIG. 1, current Technical Standards and Safety Authority (TSSA) codes require multiple story buildings 100 to have a dedicated phone line 104 installed for communication from the elevator cab(s) 103 in case of emergency. The elevator cab must be equipped with an auto dialer unit 101 and elevator cab phone 102 to establish the call on the phone line 104.

The cost for the phone lines can be anywhere from 40 to 65 dollars per month. However, the phone lines 104 are not actively monitored and can be accidentally disconnected without notice. The phone lines 104 must be tested on a monthly basis to ensure the auto dialer 101 functionality is still working.

With the current technology, the monitoring center operators 107 rely solely on caller ID from the PBX 106 to identify the caller's location and account information. When an incoming emergency call is received, the operator 107 must enter the caller ID information (if available) into their automation system workstation 108 in order to retrieve the account information and more importantly the building address. In some instances, newer installations would have a playback device installed that will allow the operator in the monitoring center to press a digit to hear a pre-recorded message (detailing the sites information). Approximately 90 percent of existing elevator installations are active with traditional Auto Dialer 101 technology—no recorded message functionality. This call flow topology is very inefficient and is susceptible to human error when troubleshooting where the call is actually being generated.

What is needed is an emergency communication solution that is more efficient and less susceptible to human error than current solutions in the art. What is also needed is an emergency communication solution that improves the communication between the operator and the caller.

SUMMARY

In accordance with one embodiment, a communication system for emergency communication comprises a communication server to establish an IP based voice communication between an endpoint and a monitoring center. In one implementation, the system establishes an emergency call using an emergency communication system comprising a communication endpoint, a communication interface and a monitoring center comprising an automation system and a communication server to establish an IP based voice communication. The system initiates the emergency call at the endpoint location using the communication interface, establishes an IP based voice communication between the endpoint and the monitoring center via the communication server, and automatically sends a message from the communication server to the automation system when the call is initiated.

A preferred Emergency Communication Solution (ECS) includes two components which together will establish a monitored IP connection that provides i) a two-way speech path between an operator and an emergency user, ii) detailed site information to the operator by integrating with the existing automation system, and iii) optional video conferencing capabilities between the operator and the emergency user.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

The Emergency Communication Solution (ECS) consists of two key components that work together to provide an actively monitored communication path between emergency phone and a monitoring center in a location remote from the emergency phone.

Figure 2:
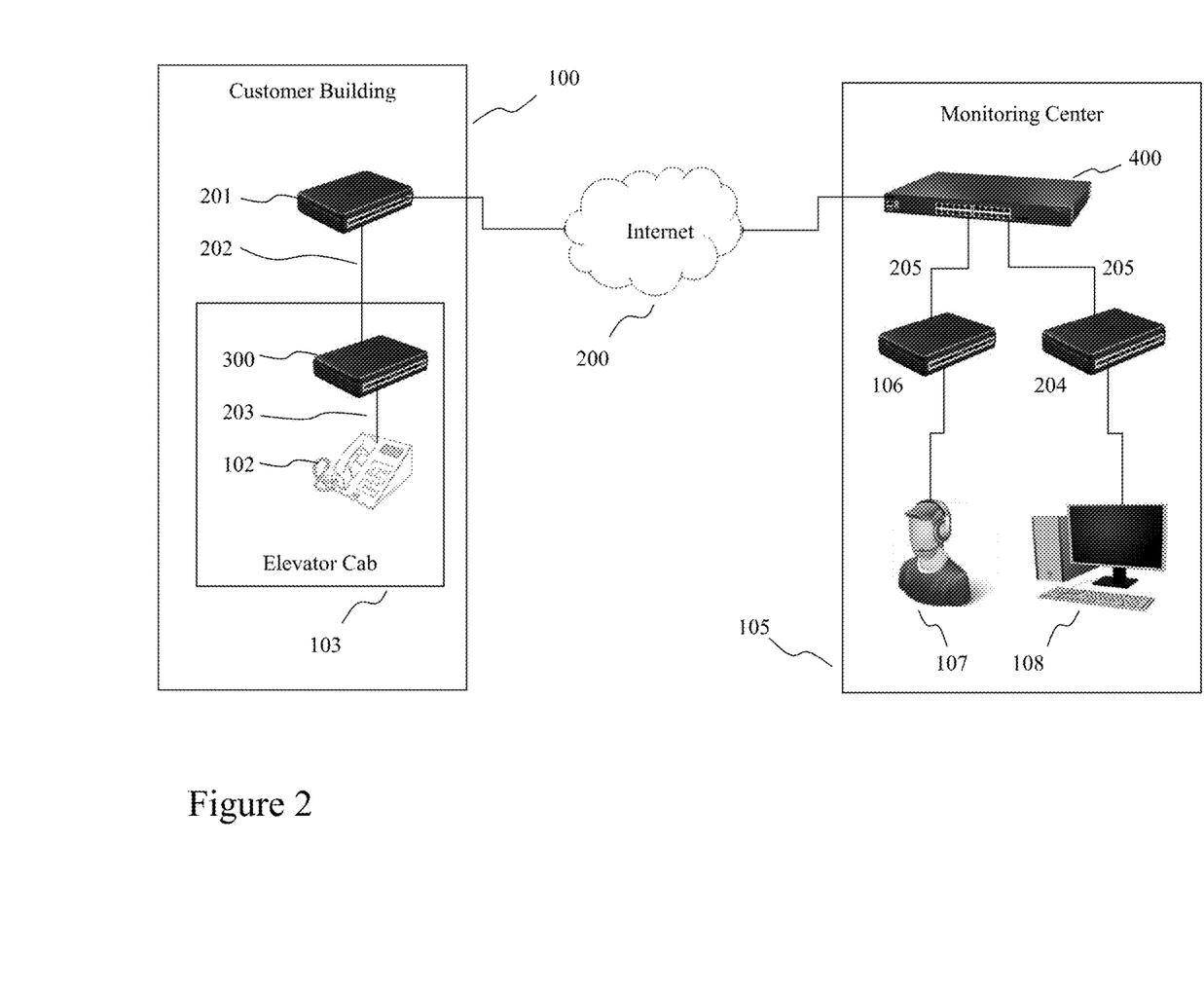
FIG. 2 is a diagram of the Emergency Communication Solution functional topology.

Referring to FIG. 2, when the phone 102 is taken off hook by the distressed party inside the elevator cab 103, dial tone and auto dial functionality (auto dialer 201) is initiated by the Emergency Communication Solution Endpoint (ECSE) unit 300. The telephone 102 is connected to the ECSE unit 300 by telephone cable 203 and the autodialer 201 is connected to the ECSE unit by telephone cable 202. It should be noted by a person ordinarily skilled in the art that different means to connect the various devices at the user location, including CAT5 cables and fiber optic cables are possible and are included within the scope of the claims of the present invention. The ECSE sends an IP packet request to the Emergency Communication Solution Server (ECSS) 400 to initiate a Voice over Internet Protocol (VOIP) communication between the caller and an emergency monitoring center 105 which is located elsewhere.

Once the ECSS 400 device located in the Monitoring Center 105, detects the incoming IP packet request from the ECSE 300 device, two tasks are started in parallel:

The ECSS 400 connects the 2-way (VoIP) audio from the elevator cab phone 102 (received via the Internet through ECSE device 300) to the monitoring center systems PBX 106 unit. The physical connection between the ECSS 400 analog trunk module connection port 404 shown in FIG. 4, and the PBX 106 is established using a 2 conductor voice cable 205. Another 2 conductor voice cable 205 connects the ECSS device 400 and the monitoring center automation system 204. Once the PBX 106 receives the incoming call, the call is routed to the operator's 107 phone. Using the ECSS 400 and ECSE 300 devices to establish this call using VoIP eliminates the need for a carrier provided analog phone line, therefore eliminating the monthly costs associated with such a line.

Figure 4:
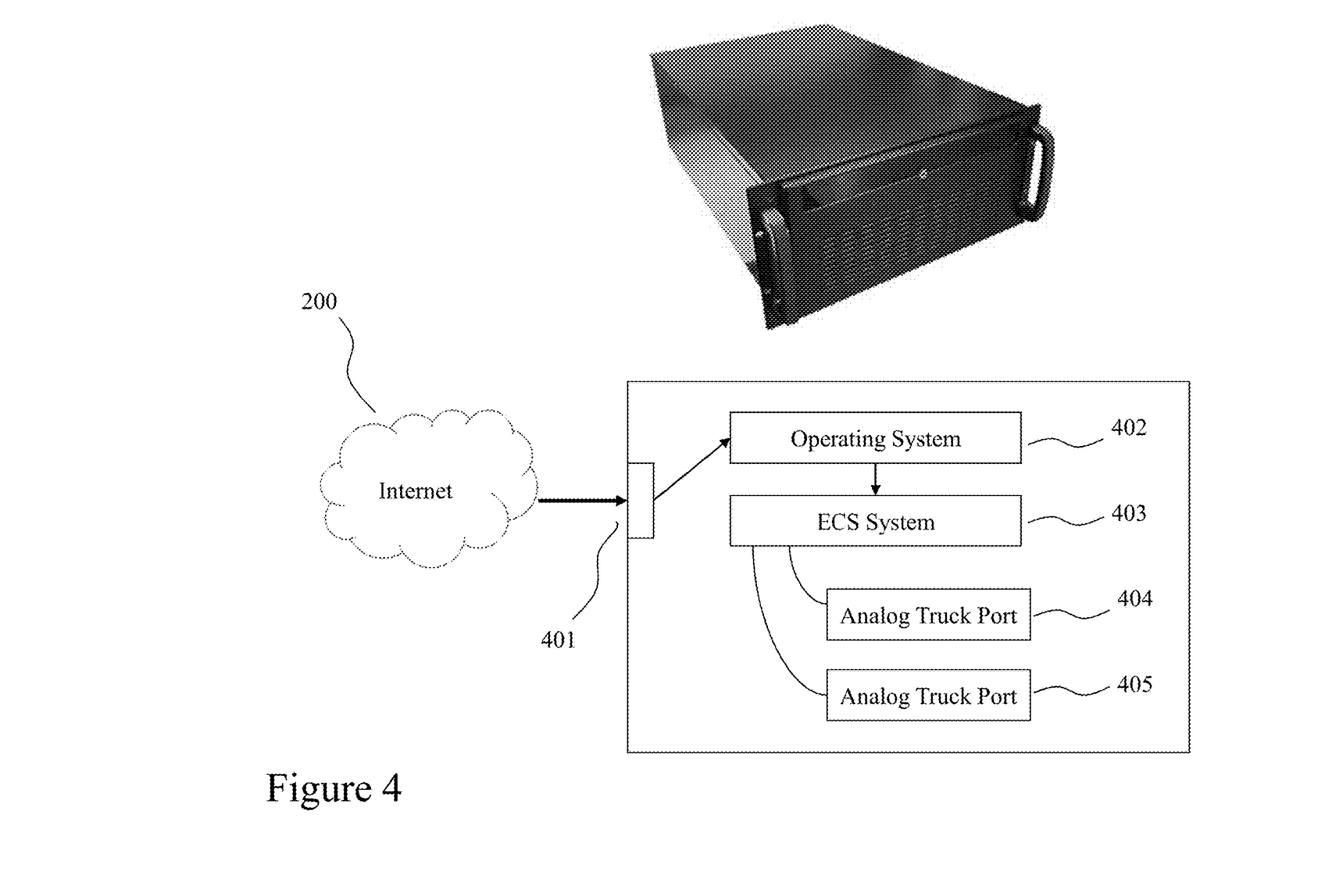
FIG. 4 is a diagram of the Emergency Communication Solution Server ECSS 200 components.

When the ECSS device 400 detects the incoming IP Packet from the ECSE 300 device it generates a message that is relayed through the analog trunk module connection 405 shown in FIG. 4, to the monitoring center automation system 204. The automation system 204 then delivers the account information including the caller's location, to the operator's workstation 108.

Figure 3:
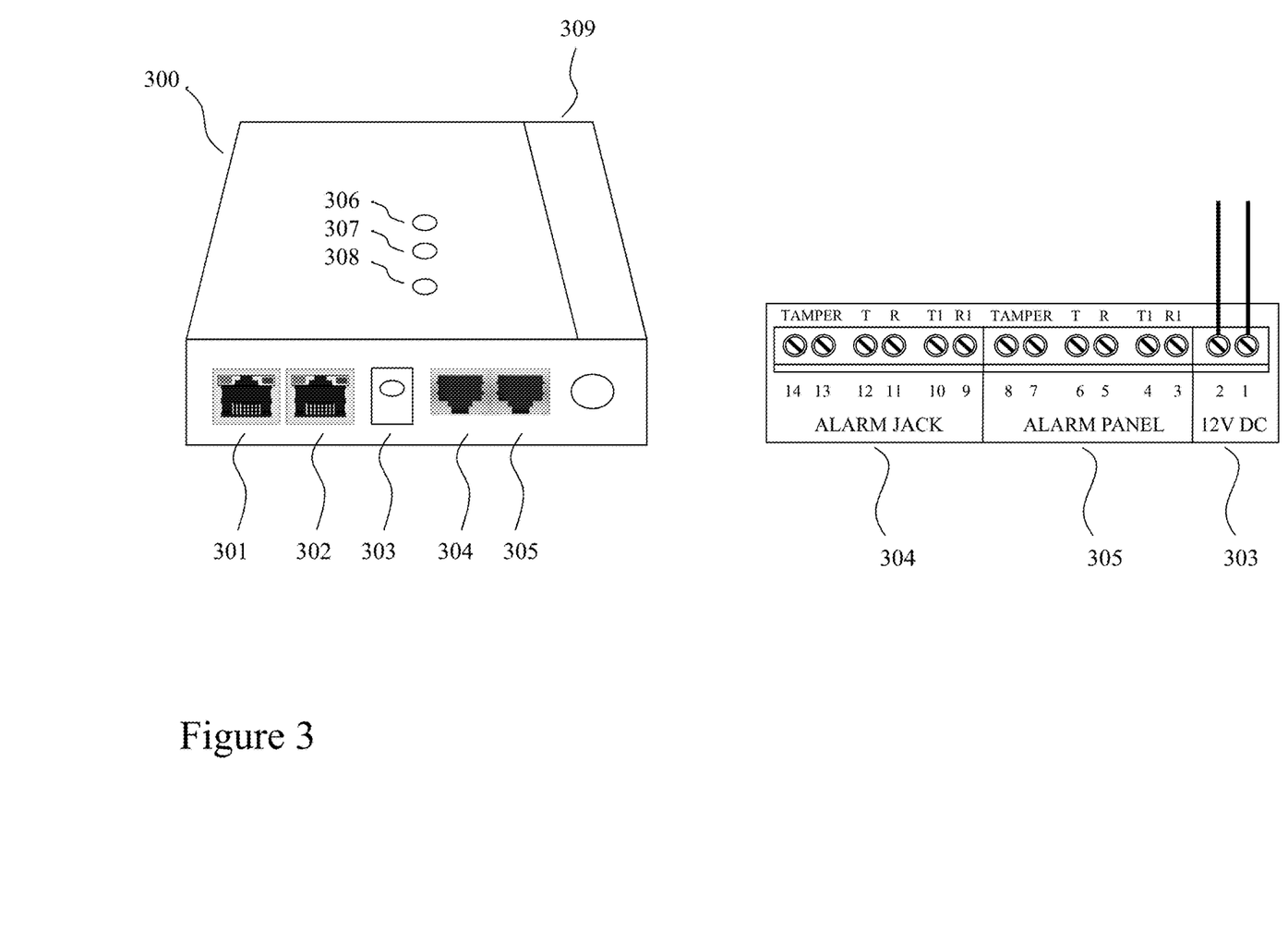
FIG. 3 is a diagram of the Emergency Communication Solution Endpoint ECSE 300 components.

Referring to FIG. 3, the first component is the Emergency Communication Solution Endpoint (ECSE) 300, which is installed at the location where Emergency Communication is required (e.g. in an elevator cab 103).

In a preferred embodiment, the ECSE device 300 contains the following components:
 Local IP based Administrator Port 301
 LAN connection for Internet connectivity 302
 Power connection (plug or hard wire capability) 303
 Backup phone analog port 304
 Emergency phone analog port 305
 Power indicator 306
 System status indicator 307
 Call status indicator 308
 Terminal strip 309—All analog and power connections 303, 304 and 305 can be connected using connectors or hard wired method (via terminal strip 309)

Some of the features or components are optional, except for the LAN connectivity 302 and power connection 303.

Referring to FIG. 4, the second component is the Emergency Communication Solution Server ECSS 400, which is installed in the monitoring center 105 datacenter.

In a preferred embodiment, the ECSS 400 unit contains the following key components installed inside a standard server chassis:
 1. LAN Connection 401.
 2. Linux based operating system 402.
 3. ECS proprietary software module 403.
 4. Analog trunk module connection to monitoring center telephone system 404.
 5. Analog trunk module connection to monitoring center automation system 405.

Figure 5:
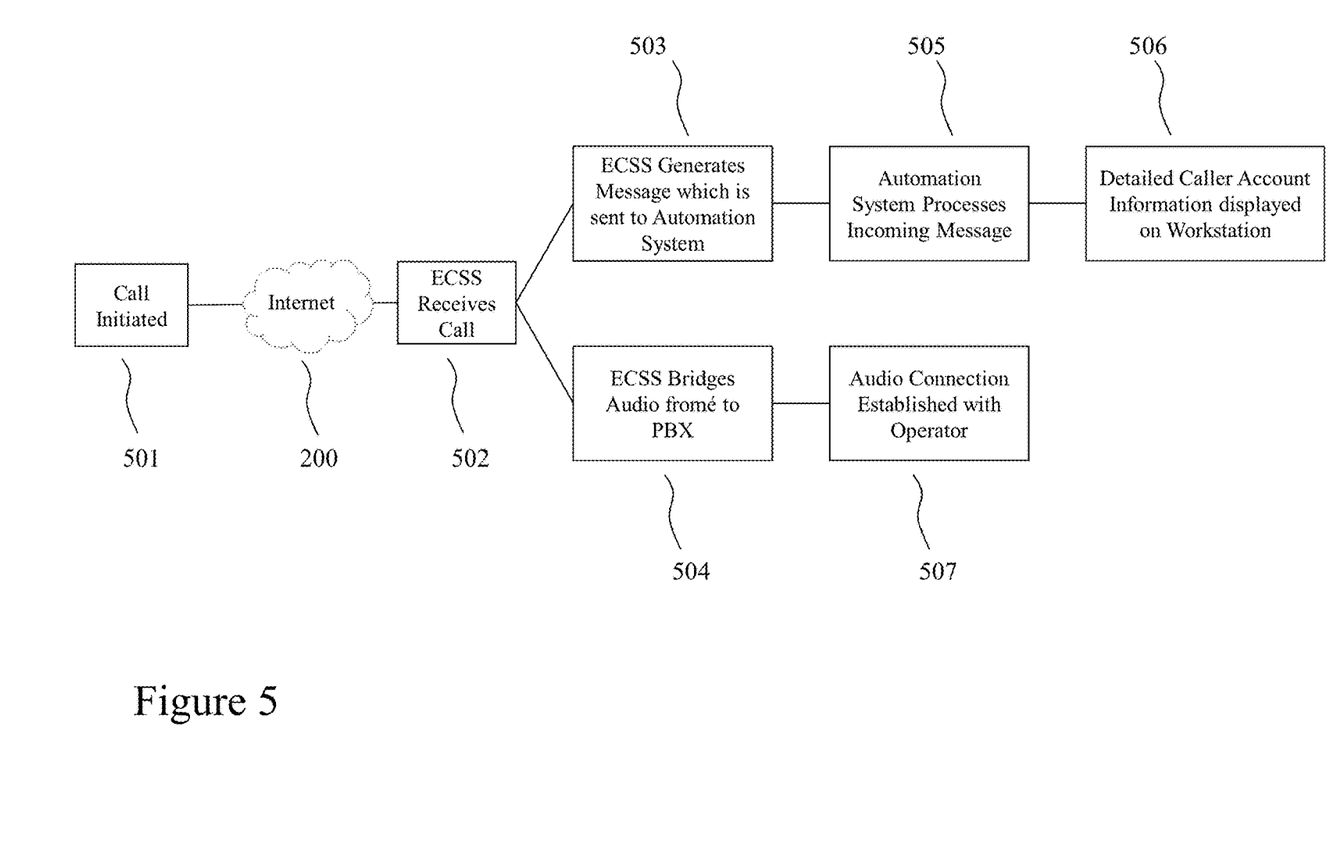
FIG. 5 is a diagram of the Emergency Communication Solution and call flow diagram.

FIG. 5 describes the call flow for an ECS emergency call described in FIG. 2. When a call is initiated 501 using the phone 102, the call is routed via an Internet connection using VoIP 200 by the ECSE 201. The ECSS 400 receives the call 502, determines the caller ID, accesses the database to find the corresponding client information, and generates a message 503 which is sent to the automation system 405. The message contains account information and location information including the building address where the call originated. The automation system 204 processes the incoming message 505 and the detailed caller account information and building address is displayed 506 on the workstation 108. The ECSS also bridges the audio 504 to the PBX 106 and an audio connection is established 507 with the operator 107 enabling 2 way audio communication between the operator and the caller.

Figure 6:
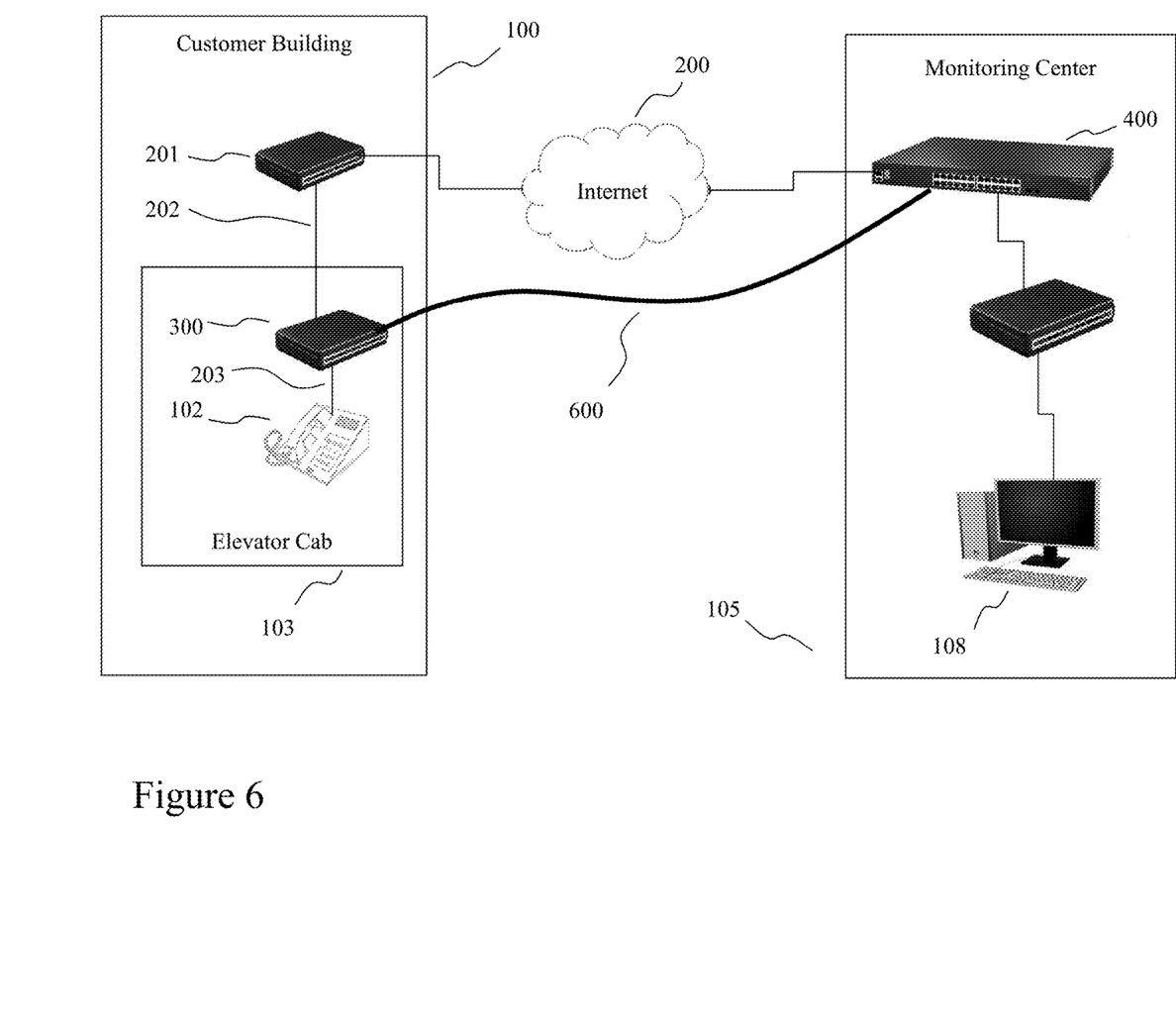
FIG. 6 is a diagram of the monitored IP connection between the ECSS and ECSE.

Referring to FIG. 6, in another preferred embodiment, additional functionality provided by the Emergency Communication Solution technology includes a monitored heartbeat 600 to monitor the status and readiness of the system. If the ECSE's 300 IP connection goes offline for a period of time, the ECSS 400 device is programmed to generate a communication failure message after a predetermined time period that the device is offline, has passed. The failure message is relayed through the Analog Trunk Module connection 405 to the monitoring center's automation system 204. The automation system then delivers the outage notification to the operator's workstation 108. The operator 107 can then notify the customer of the network issues being seen at the customer site so that the customer can correct any problems with their equipment.

Figure 7:
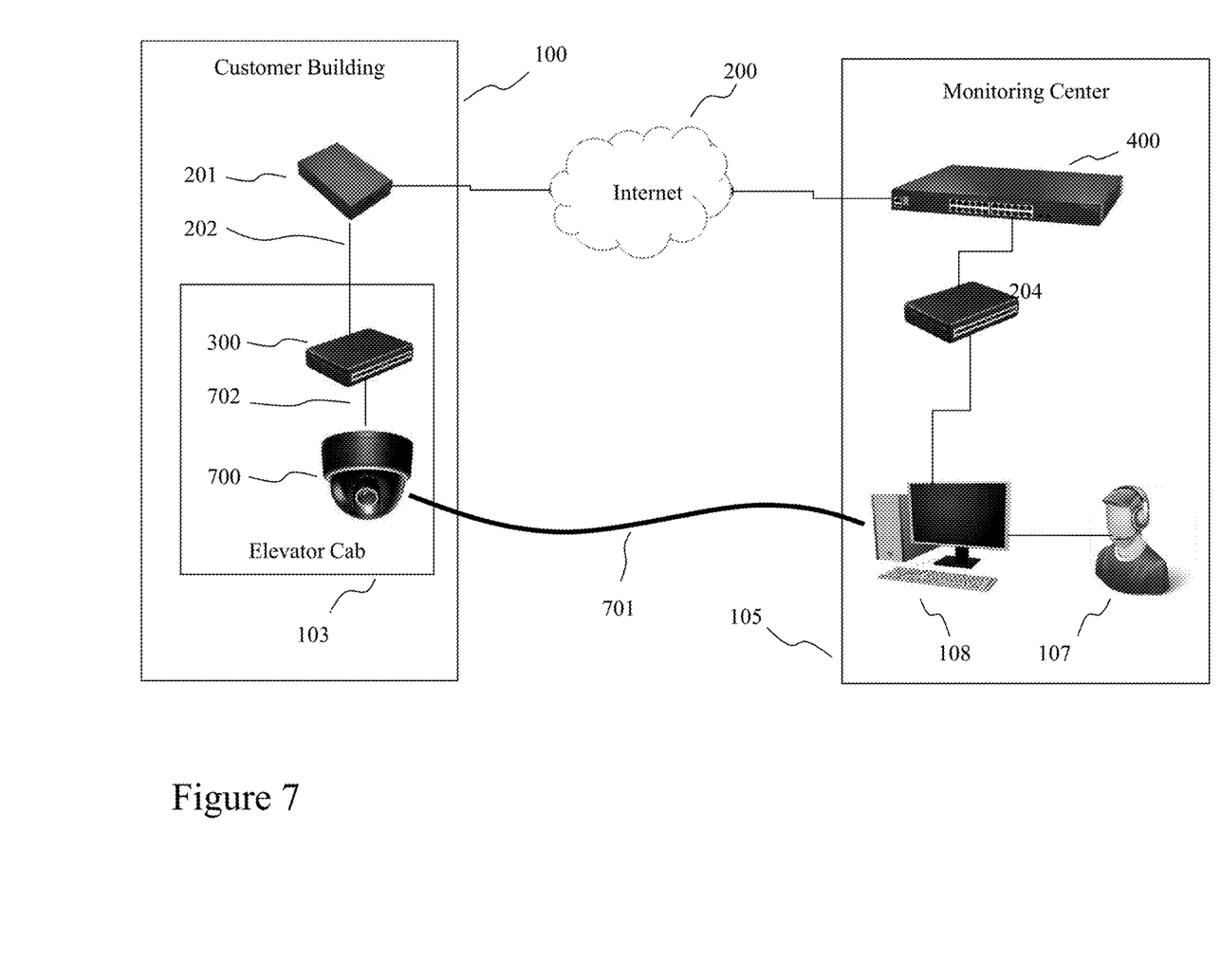
FIG. 7 is a diagram of the optional video functionality that can be incorporated into the Emergency Communication Solution.

In another preferred embodiment shown in FIG. 7, the Emergency Communication Solution technology can also establish 2-way video communications between the operator and the caller. Instead of audio being bridged through the ECSS 400 device, a video call 701 is established directly between the elevator cab camera 700 and the operator at the monitoring center. The elevator cab camera 700 is connected to the ESCE 300 device using a CAT5 cable 702. It should be noted by a person ordinarily skilled in the art that other types of cable can be used to achieve a video connection without departing from the scope of the invention. While the video call is in progress, the ECSS 400 device continues to generate the message that is relayed through the Analog Trunk Module connection to Monitoring Center Automation System 204 (message contains the site information).

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method comprising:
providing a computer server coupled to a communications network supporting Internet Protocol (IP) based communications;
determining connectivity of a remote device of a plurality of remote devices to the communications network in dependence upon receiving "heart beat" IP messages associated with the remote device of the plurality of remote devices, wherein each remote device is associated with a predetermined element of infrastructure and generates "heart beat" IP messages; wherein
upon determining a lack of connectivity of the remote device of the plurality of remote devices a first alarm sequence is executed; and
upon determining connectivity of the remote device of a plurality of remote devices:
   determining whether an event associated with the remote device of the plurality of remote devices has occurred; and
   upon a positive determination with respect to an event associated with the remote device a second alarm sequence is executed.

2. The method according to claim 1, wherein
the first alarm sequence comprises either:
   establishing an identity associated with the remote device of the plurality of remote devices triggering the action from a first database lookup;
   establishing contact data relating to the element of infrastructure associate with the remote device identity from a second database lookup; and
   sending a notification using the contact data of a connectivity issue relating to the element of infrastructure;
or:
   establishing an identity associated with the remote device of the plurality of remote devices triggering the action from a first database lookup;
   establishing data relating to the element of infrastructure associated with the remote device identity from a second database lookup;
   establishing contact data relating to the identified element of infrastructure; and
   sending a notification to a computer system for processing and display to an operator of the computer system, the notification comprising the data and contact data.

3. The method according to claim 1, wherein
the second alarm sequence comprises either:
   establishing an identity associated with the remote device of the plurality of remote devices triggering the action from a first database lookup;
   establishing data relating to the element of infrastructure associated with the remote device identity from a second database lookup;
   establishing contact data relating to the identified element of infrastructure;
   sending a notification to a computer system for processing and display to an operator of the computer system, the notification comprising the data and contact data; and
   connecting the operator to the remote device to allow bidirectional audio communications;
or:
   establishing an identity associated with the remote device of the plurality of remote devices triggering the action from a first database lookup;
   establishing data relating to the element of infrastructure associated with the remote device identity from a second database lookup;
   establishing contact data relating to the identified element of infrastructure;
   sending a notification to a computer system for processing and display to an operator of the computer system, the notification comprising the data and contact data;
   connecting the operator to the remote device of the plurality of remote devices to allow bidirectional audio communications; and
   displaying to the operator visual information obtained from a camera associated with the predetermined element of infrastructure.

4. The method according to claim 1, wherein
the remote device of the plurality of remote devices comprises a communications interface and an emergency system endpoint device; and
the remote device of the plurality of remote devices is installed as part of the predetermined element of infrastructure.

5. The method according to claim 1, wherein
the second alarm sequence comprises enabling a camera associated with the predetermined element of infrastructure.

6. A method comprising:
providing a user interface coupled to a communications network supporting Internet Protocol (IP) based communications via a communications interface, wherein the user interface forms part of a first predetermined element of infrastructure, the communications interface forms part of a second predetermined element of infrastructure, and activation of the user interface when detected by a remote computer server coupled to a communications network supporting Internet Protocol (IP) based communications constitutes detecting an event relating to the predetermined element of infrastructure;
providing via the communications interface "heart beat" IP messages to the remote computer server, wherein detection by the remote computer server of the "heart beat" IP messages constitutes connectivity of the communications interface to the remote computer server;
providing a first emergency response sequence in response to a determination of a break in connectivity; and
providing a second emergency response sequence in respect to a determination of an event whilst connectivity is established.

7. The method according to claim 6, wherein
the first emergency response sequence comprises either:
   establishing an identity associated with the "heart beat" IP messages triggering the determination of a break from a first database lookup;
   establishing contact data relating to the element of infrastructure associate with the remote device identity from a second database lookup; and
   sending a notification using the contact data of a connectivity issue relating to the element of infrastructure;
or
   establishing an identity associated with the "heart beat" IP messages triggering the determination of a break from a first database lookup;

establishing data relating to the element of infrastructure associated with the identity from a second database lookup;
establishing contact data relating to the identified element of infrastructure; and
sending a notification to a computer system for processing and display to an operator of the computer system, the notification comprising the data and contact data.

8. The method according to claim 6, wherein
the second emergency response sequence comprises either:
establishing an identity associated with the "heart beat" IP messages triggering the determination of a break from a first database lookup;
establishing data relating to the element of infrastructure associated with the identity from a second database lookup;
establishing contact data relating to the identified element of infrastructure;
sending a notification to a computer system for processing and display to an operator of the computer system, the notification comprising the data and contact data; and
connecting the operator to the remote device to allow bidirectional audio communications;
or
establishing an identity associated with the "heart beat" IP messages triggering the determination of a break from a first database lookup;
establishing data relating to the element of infrastructure associated with the remote device identity from a second database lookup;
establishing contact data relating to the identified element of infrastructure;
sending a notification to a computer system for processing and display to an operator of the computer system, the notification comprising the data and contact data;
connecting the operator to the remote device of the plurality of remote devices to allow bidirectional audio communications; and
displaying to the operator visual information obtained from a camera associated with the predetermined element of infrastructure.

9. The method according to claim 6, wherein
at least one of:
the second emergency response sequence comprises enabling a camera associated with the predetermined element of infrastructure; and
the user interface is at least one of an audio interface and an audiovisual interface.

10. The method according to claim 7, wherein
at least one of:
the first predetermined element of infrastructure and the second element of infrastructure are the same;
the first predetermined element of infrastructure and the second element of infrastructure are different elements of infrastructure and the communications interface receives "heart beat" IP messages from the first predetermined element of infrastructure and forwards these to the remote server; and
the first predetermined element of infrastructure and the second element of infrastructure are different elements of infrastructure and the communications interface generates the "heart beat" IP messages.

11. A system comprising:
a computer server coupled to a communications network supporting Internet Protocol (IP) based communications;
a non-volatile non-transitory storage medium comprising instructions executable by a microprocessor forming part of the computer server, the instructions when executed relating to a process comprising:
determining connectivity of a remote device of a plurality of remote devices to the communications network in dependence upon receiving "heart beat" IP messages associated with the remote device of the plurality of remote devices, wherein each remote device is associated with a predetermined element of infrastructure and generates "heart beat" IP messages; wherein
upon determining a lack of connectivity of the remote device of the plurality of remote devices a first alarm sequence is executed; and
upon determining connectivity of the remote device of a plurality of remote devices:
determining whether an event associated with the remote device of the plurality of remote devices has occurred; and
upon a positive determination with respect to an event associated with the remote device a second alarm sequence is executed.

12. The system according to claim 11, wherein
the first alarm sequence comprises either:
establishing an identity associated with the remote device of the plurality of remote devices triggering the action from a first database lookup;
establishing contact data relating to the element of infrastructure associate with the remote device identity from a second database lookup; and
sending a notification using the contact data of a connectivity issue relating to the element of infrastructure;
or:
establishing an identity associated with the remote device of the plurality of remote devices triggering the action from a first database lookup;
establishing data relating to the element of infrastructure associated with the remote device identity from a second database lookup;
establishing contact data relating to the identified element of infrastructure; and
sending a notification to a computer system for processing and display to an operator of the computer system, the notification comprising the data and contact data.

13. The system according to claim 11, wherein
the second alarm sequence comprises either:
establishing an identity associated with the remote device of the plurality of remote devices triggering the action from a first database lookup;
establishing data relating to the element of infrastructure associated with the remote device identity from a second database lookup;
establishing contact data relating to the identified element of infrastructure;
sending a notification to a computer system for processing and display to an operator of the computer system, the notification comprising the data and contact data; and
connecting the operator to the remote device to allow bidirectional audio communications;

or:
  establishing an identity associated with the remote device of the plurality of remote devices triggering the action from a first database lookup;
  establishing data relating to the element of infrastructure associated with the remote device identity from a second database lookup;
  establishing contact data relating to the identified element of infrastructure;
  sending a notification to a computer system for processing and display to an operator of the computer system, the notification comprising the data and contact data;
  connecting the operator to the remote device of the plurality of remote devices to allow bidirectional audio communications; and
  displaying to the operator visual information obtained from a camera associated with the predetermined element of infrastructure.

14. The system according to claim 11, wherein
the remote device of the plurality of remote devices comprises a communications interface and an emergency system endpoint device; and
the remote device of the plurality of remote devices is installed as part of the predetermined element of infrastructure.

15. The system according to claim 11, wherein
the second alarm sequence comprises enabling a camera associated with the predetermined element of infrastructure.

16. A system comprising:
a user interface coupled to a communications network supporting Internet Protocol (IP) based communications via a communications interface, wherein the user interface forms part of a first predetermined element of infrastructure, the communications interface forms part of a second predetermined element of infrastructure, and activation of the user interface when detected by a remote computer server coupled to a communications network supporting Internet Protocol (IP) based communications constitutes detecting an event relating to the predetermined element of infrastructure;
the communications interface for transmitting "heart beat" IP messages to the remote computer server and for transmitting bidirectional communications between the user interface and the remote server, wherein detection by the remote computer server of the "heart beat" IP messages constitutes connectivity of the communications interface to the remote computer server; wherein
the remote server executes a first emergency response sequence in response to a determination of a break in connectivity and executes a second emergency response sequence in respect to a determination of an event whilst connectivity is established.

17. The system according to claim 16, wherein
the first emergency response sequence comprises either:
  establishing an identity associated with the "heart beat" IP messages triggering the determination of a break from a first database lookup;
  establishing contact data relating to the element of infrastructure associate with the remote device identity from a second database lookup; and
  sending a notification using the contact data of a connectivity issue relating to the element of infrastructure;
or
  establishing an identity associated with the "heart beat" IP messages triggering the determination of a break from a first database lookup;
  establishing data relating to the element of infrastructure associated with the identity from a second database lookup;
  establishing contact data relating to the identified element of infrastructure; and
  sending a notification to a computer system for processing and display to an operator of the computer system, the notification comprising the data and contact data.

18. The system according to claim 16, wherein
the second emergency response sequence comprises either:
  establishing an identity associated with the "heart beat" IP messages triggering the determination of a break from a first database lookup;
  establishing data relating to the element of infrastructure associated with the identity from a second database lookup;
  establishing contact data relating to the identified element of infrastructure;
  sending a notification to a computer system for processing and display to an operator of the computer system, the notification comprising the data and contact data; and
  connecting the operator to the remote device to allow bidirectional audio communications;
or
  establishing an identity associated with the "heart beat" IP messages triggering the determination of a break from a first database lookup;
  establishing data relating to the element of infrastructure associated with the remote device identity from a second database lookup;
  establishing contact data relating to the identified element of infrastructure;
  sending a notification to a computer system for processing and display to an operator of the computer system, the notification comprising the data and contact data;
  connecting the operator to the remote device of the plurality of remote devices to allow bidirectional audio communications; and
  displaying to the operator visual information obtained from a camera associated with the predetermined element of infrastructure.

19. The system according to claim 16, wherein
at least one of:
  the second emergency response sequence comprises enabling a camera associated with the predetermined element of infrastructure; and
  the user interface is at least one of an audio interface and an audiovisual interface.

20. The system according to claim 17, wherein
at least one of:
  the first predetermined element of infrastructure and the second element of infrastructure are the same;
  the first predetermined element of infrastructure and the second element of infrastructure are different elements of infrastructure and the communications interface receives "heart beat" IP messages from the first predetermined element of infrastructure and forwards these to the remote server; and the first predetermined element of infrastructure and the second element of infrastructure are different elements of infrastructure and the communications interface generates the "heart beat" IP messages.

* * * * *